United States Patent
Schwarzbich

(10) Patent No.: US 10,907,673 B2
(45) Date of Patent: Feb. 2, 2021

(54) TOLERANCE COMPENSATING ELEMENT

(71) Applicant: Jörg Schwarzbich, Bielefeld (DE)

(72) Inventor: Jörg Schwarzbich, Bielefeld (DE)

( * ) Notice: Subject to any disclaimer, the term of this patent is extended or adjusted under 35 U.S.C. 154(b) by 185 days.

(21) Appl. No.: 16/328,881

(22) PCT Filed: Sep. 15, 2017

(86) PCT No.: PCT/EP2017/073330
§ 371 (c)(1),
(2) Date: Feb. 27, 2019

(87) PCT Pub. No.: WO2018/054785
PCT Pub. Date: Mar. 29, 2018

(65) Prior Publication Data
US 2019/0203752 A1 Jul. 4, 2019

(30) Foreign Application Priority Data

Sep. 22, 2016 (DE) .................... 20 2016 105 286 U

(51) Int. Cl.
*F16B 5/02* (2006.01)

(52) U.S. Cl.
CPC .......... *F16B 5/0283* (2013.01); *F16B 5/0233* (2013.01); *F16B 5/0266* (2013.01)

(58) Field of Classification Search
CPC ...... F16B 5/0233; F16B 5/025; F16B 5/0283; F16B 31/002
USPC ................................................ 411/546, 999
See application file for complete search history.

(56) References Cited

U.S. PATENT DOCUMENTS

| 5,340,258 | A | * | 8/1994 | Simon | .................... | F16B 35/005 |
| | | | | | | 411/339 |
| 5,967,725 | A | * | 10/1999 | Voges | ..................... | F16B 35/00 |
| | | | | | | 411/302 |
| 6,062,791 | A | | 5/2000 | Simon | | |
| 6,238,123 | B1 | * | 5/2001 | Schwarzbich | ........ | F16B 5/0233 |
| | | | | | | 403/12 |
| 6,543,956 | B2 | * | 4/2003 | Schwarzbich | ........ | F16B 5/0233 |
| | | | | | | 403/167 |
| 9,464,659 | B2 | * | 10/2016 | Schwarzbich | .......... | F16B 35/04 |

(Continued)

FOREIGN PATENT DOCUMENTS

DE            4237981 A1     5/1993
DE            20021194 U1    4/2002

(Continued)

*Primary Examiner* — Flemming Saether
(74) *Attorney, Agent, or Firm* — Richard M. Goldberg

(57) ABSTRACT

A tolerance compensating element for a device for connecting components by a connecting screw, includes an inner and an outer threaded part (10, 12), which are in threaded engagement with one another and, together, form a length-adjustable spacer (14), and a sleeve (30) which is held in the inner threaded part (10) and holds a spring element (34) in a position in which it comes into frictional contact with the circumference of the inserted connecting screw, and an unscrew protection device (44) in the form of a ring that is rotatably supported at one end of the spacer (14) and includes at least one arm (48) which projects axially into the sleeve (30) and, at the free end, forms an outwardly cranked claw (50) against which a stop (54) formed on the sleeve (30) abuts when a maximum unscrewing distance of the inner threaded part (10) is reached.

12 Claims, 2 Drawing Sheets

(56) References Cited

U.S. PATENT DOCUMENTS

| | | | |
|---|---|---|---|
| 10,145,399 B2* | 12/2018 | Haselberger | ............ B64D 11/02 |
| 2020/0032825 A1* | 1/2020 | Lamoureux | ............ F16B 5/0233 |
| 2020/0191184 A1* | 6/2020 | Lamoureux | ............. F16B 43/02 |

FOREIGN PATENT DOCUMENTS

| | | |
|---|---|---|
| DE | 102005037192 A1 | 2/2007 |
| DE | 102012007996 A1 | 10/2013 |
| DE | 102012105890 A1 | 1/2014 |
| DE | 102015103491 A1 | 8/2016 |
| EP | 1180605 A1 | 2/2002 |
| EP | 1215401 B1 | 1/2005 |
| WO | 2014/005899 A1 | 1/2014 |
| WO | 2014/120707 A1 | 8/2014 |

* cited by examiner

TOLERANCE COMPENSATING ELEMENT

BACKGROUND OF THE INVENTION

The invention relates to a tolerance compensating element for a device for connecting components by means of a connecting screw inserted through the tolerance compensating element, said tolerance compensating element comprising an inner and an outer threaded part which are in threaded engagement with one another and, together, form a length-adjustable spacer, and a sleeve which is held in the inner threaded part and holds a spring element in a position in which it comes into frictional contact with the circumference of the inserted connecting screw.

WO 2014/005899 A1 discloses a tolerance compensating element of this type wherein the two threaded parts are formed at low costs by wound spring steel wire. The spring element that is held by the sleeve at the inner threaded part constitutes a slide coupling by which a torque can be transmitted from the connecting screw onto the inner threaded part when the connecting screw is screwed into one of the components to be connected. In this way, when the connecting screw is screwed-in, a corresponding unscrew movement of the inner threaded part may be induced automatically, said unscrew movement persisting until the spacing between the components to be connected has been bridged.

EP 1 215 401 B1 discloses a tolerance compensating element having an unscrew protection device that prevents the inner threaded part from being totally unscrewed from the outer threaded part. To that end, a socket that is press-fitted onto the outer periphery of the outer threaded part forms a stop that reaches over one end of the outer threaded part, and, when the maximum unscrewing distance has been reached, abuts at a shoulder that is formed at the end of the threaded portion of the inner threaded part. This stop limits the unscrew movement of the inner threaded such that the threaded portion thereof remains always inside the outer threaded part and only a non-threaded portion of the inner threaded part projects from the outer threaded part.

SUMMARY OF THE INVENTION

It is an object of the invention to provide an improved unscrew protection device that can be used for tolerance compensating elements of the first mentioned type.

According to the invention, this object is achieved by an unscrew protection device in the form of a ring that is rotatably supported at one end of the spacer and comprises at least one arm which projects axially into the sleeve and, at the free end, forms an outwardly cranked claw against which a stop formed on the sleeve abuts when a maximum unscrewing distance of the inner threaded part is reached.

Thus, according to the invention, the stop is formed on the sleeve that is held inside the inner threaded part, and the claw cooperating with the stop is formed on an arm that extends axially from one end of the spacer through the interior of the sleeve. Then, at the time when the connecting screw is screwed in, the spring element, the sleeve and the inner threaded part rotate together therewith, the ring forming the unscrew protection device can rotate together therewith, so that the spring element and the arm of the unscrew protection device are always in positions angularly offset from one another and, consequently, the frictional contact between the connecting screw and the spring element can be maintained.

It is an advantage of the invention that the threaded portion of the inner threaded part can extend essentially over the entire axial length of this treaded part, including also the portion which projects from the outer threaded part when the unscrewing distance is maximal.

Useful details and further developments of the invention are indicated in the dependent claims.

The arm of the unscrew protection device can have a dovetail profile or a T-shaped profile and may fit in an undercut groove and dovetail groove, respectively, in the inner peripheral surface of the sleeve.

The sleeve may have, at least on a part of its outer periphery, a thread that permits to screw the sleeve into the inner threaded part.

In a useful embodiment, both threaded parts are formed of wound wire.

On its opposite ends, the spacer may have metal terminating disks one of which has a relief-like recess that is complementary to the first turn of the outer threaded part or both threaded parts, whereas the other terminating disk has a relief-like recess that is complementary to the last turn of the inner threaded part or both threaded parts. This permits to compensate for the thread pitch of the screw-shaped turns of the threaded parts such that the surfaces of the terminating disks that face away from one another and with which the spacer engages the components to be connected are aligned exactly in parallel with one another.

The outer threaded part may be surrounded by a casing that may for example serve for clip-fastening the tolerance compensating element to one of the components to be connected. One of the terminating disks may be snap-fastened in this casing.

The other terminating disk may be snap-fastened to the sleeve that is held at the inner threaded part.

BRIEF DESCRIPTION OF THE DRAWINGS

An embodiment example will now be described in conjunction with the drawings, wherein.

DETAILED DESCRIPTION

Figure 1:
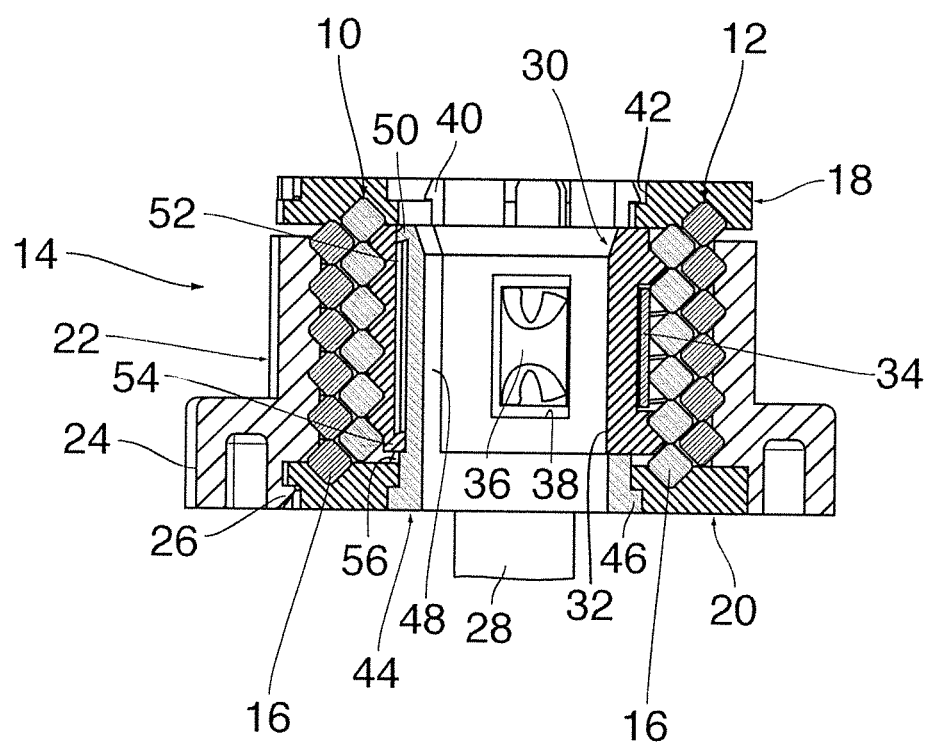
FIG. 1 is an axial section of a tolerance compensating element in a condition with minimal axial dimension.

The tolerance compensating element shown in FIG. 1 has an inner threaded part 10 and an outer threaded part 12 that are in threaded engagement with one another and, together, form a spacer 14 with adjustable length. Each of the two threaded parts 10, 12 is constituted by a wire 16, e.g. a spring steel wire, that has been wound into a coil and has a square cross-section, the wire being wound such that a diagonal of the square cross-section corresponds to the axial direction of the coil and the individual turns of the coil are engaging one another in a block configuration. The edges of the wire 16 may be slightly rounded or chamfered, so that the wire will not bulge inwardly or outwardly when the coil is under axial load.

A metal terminating disk 18 is fixed to the top end of the inner threaded part 10, the bottom side of the disk having a punched relief that is complementary to the topmost turns of the threaded parts 10 and 12. Correspondingly, a terminating disk 20 is attached to the bottom end of the outer threaded part 12, said disk having on the top side a relief that is complementary to the lowermost turns of the threaded parts. By means of these relief-like depressions, the thread pitches of the wire 16 are compensated such that the top and bottom surfaces of the terminating disks 18, 20 that face away from one another are aligned in parallel with one another.

The outer threaded part 12 is accommodated in a casing 22 of plastics that has a large-diameter lower part 24 which is flush with the lower terminating disk 20 that is received therein. In the example shown, the casing 22 has, in its top part, an internal thread that is complementary to an external thread of the outer threaded part 12. At the bottom end of the casing, several snap-claws 26 are distributed on the periphery of the recess that accommodates the terminating disk 20, said claws gripping around a collar at the outer rim of the terminating disk 20.

Elastic clips 28 may be formed at the outer periphery of the casing 22, said clips, only part of which has been shown here, serve for snap-fastening the tolerance compensating element to one of the components to be connected.

A plastic sleeve 30 that forms a cylindrical channel 32 extending continuously in axial direction is held in the interior of the threaded part 10. A connecting screw which has not been shown here may be inserted through this channel 32, the screw serving for interconnecting the two components. For example, the connecting screw is inserted from above through one of the components that engages the top terminating disk 18, and the screw is then screwed into a threaded bore of the other component that engages the bottom terminating disk and to which the casing 22 is snap-fastened.

On a part of its outer periphery, the sleeve 30 is surrounded by a spring element 34 that is shaped like a horseshoe and can be seen in cross-section on the right side in FIG. 1. The two ends of the horseshoe-shaped spring element 34 form to two inwardly projecting prongs 36 disposed diametrically opposite to one another and each reaching through a window 38 that is formed in the peripheral wall of the sleeve 30 and, when the connecting screw is inserted, engage the periphery of the threaded portion of the connecting screw.

In the example shown, the parts of the outer peripheral surface of the sleeve 30 that are not surrounded by the spring element 34 have an external thread that is complementary to an internal thread of the inner threaded part 10. Several upwardly projecting snap claws 40 are distributed on the periphery of the top edge of the sleeve 30, and the sleeve 30 is snap-fastened by means of these claws in a stepped bore 42 of the top terminating disk 18.

Figure 2:
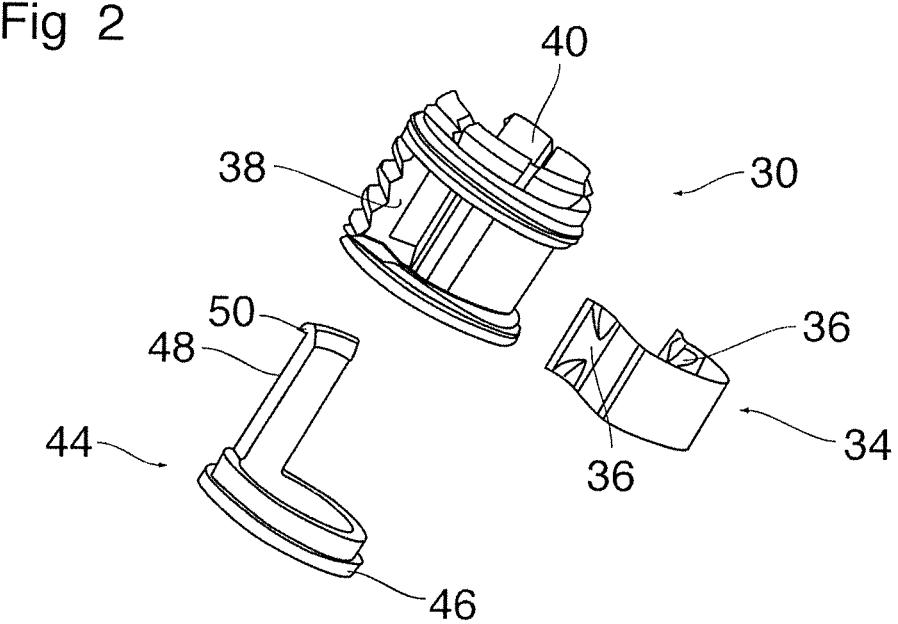
FIG. 2 shows exploded views of a sleeve, a spring element and an unscrew protection device of the tolerance compensating element according to FIG. 1.

In FIG. 2, the sleeve 30 and the spring element 34 have been shown in an exploded perspective view. Here, in particular the configuration of the spring element 34 can be seen more clearly.

Figure 3:
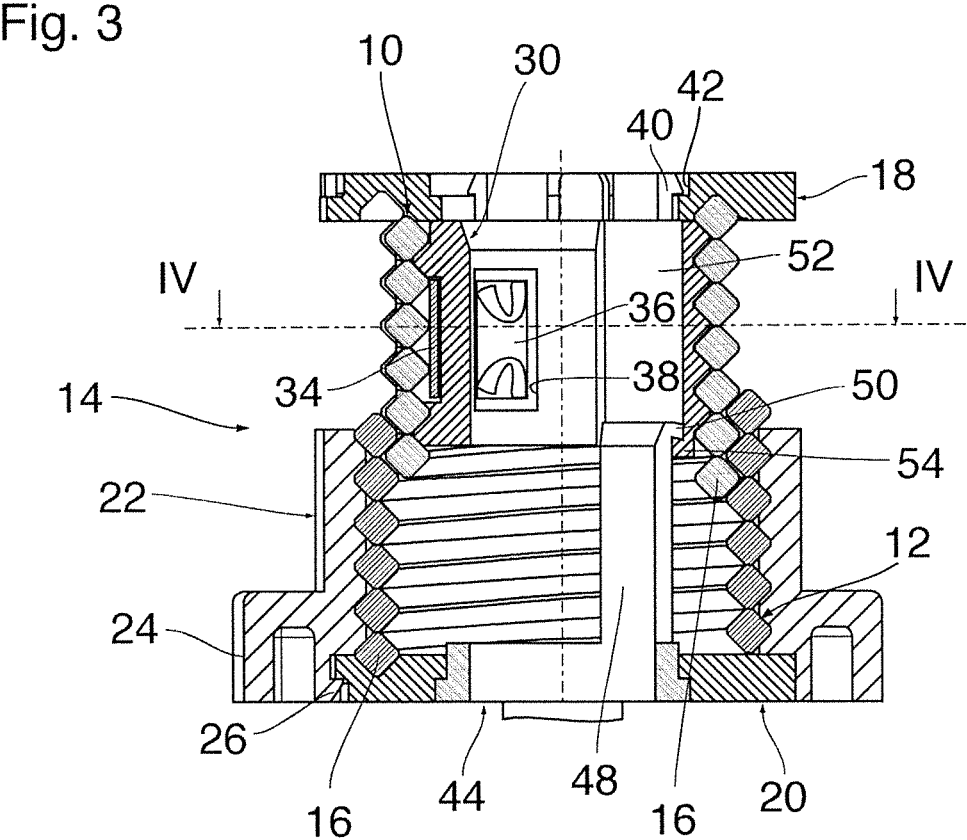
FIG. 3 shows the tolerance compensating element according to FIG. 1 in a condition with maximal axial dimension.

When the connecting screw has been inserted through the channel 32 of the sleeve 30 and is screwed into a threaded bore of the lower one of the components to be connected, the sleeve 30 and the inner threaded part 10 are entrained in rotary direction due to frictional contact between the prongs 36 of the spring element 34 and the periphery of the connecting screw, whereas the threaded part 12 remains stationary because it is immobilized at the lower component by the clips 28. The threaded parts 10, 12 have left handed threads, so that, when the connecting screw is turned rightwards, the inner threaded part 10 is upwardly screwed out of the outer threaded part 12, as can be seen in FIG. 3. This unscrew movement of the inner threaded part 10 persists until the top terminating disk 18 abuts at the upper one of the components to be connected and the spacer 14 thus bridges the distance between the two components. Since, then, the inner threaded part cannot be unscrewed further, the coupling formed by the prongs 36 and the connecting screw yields, so that the connecting screw can be screwed-in further until the components to be connected are firmly clamped against one another.

In order to prevent the inner threaded part 10 from being unscrewed totally from the outer threaded part 12, so that these two parts would fall apart, an unscrew protection device 44 is mounted on the lower terminating disk 20. As can best be seen in the perspective view in FIG. 2, the unscrew protection device 44 is a generally annular member that forms a peripheral collar 46 at its lower end and has an arm 48 projecting upwardly from one point on its periphery, said arm having an outwardly cranked claw 50 at its free end.

As is shown in FIG. 1, the arm 48 extends axially to the channel 32 in the sleeve 30 and is received in an axial groove 52 that is formed in the inner peripheral surface of the sleeve 30. At the bottom end, the groove 52 is delimited by a stop 54 for the claw 50.

The collar 46 of the unscrew protection device is received in a stepped bore of the lower terminating disk 20 such that the unscrew protection device 44 cannot move upwards relative to the terminating disk 20.

When, now, the inner threaded part 10 is rotated relative to the outer threaded part 12 in unscrew direction (rightwards), the sleeve 30 moves upward together with the inner threaded part 10, and the claw 50 moves downwards in the groove 52 until it reaches the stop 54. In this way, the unscrew movement of the inner threaded part 10 is limited.

FIG. 3 shows a condition in which the inner threaded part 10 has reached its maximum unscrew distance and the claw 50 engages the stop 54. Since the unscrew distance is limited, it is assured that the threaded parts 10 and 12 always remain in sufficient engagement with one another, so that these two threaded parts are safely connected to one another and the spacer 14 as a whole can still absorb a large axial force.

Since, in the transition from the position shown in FIG. 1 to the position according to FIG. 3, the inner threaded part 10 and the sleeve 30 have been rotated by a non-integer number of terms, they appear in a rotated position in FIG. 3. Accordingly, the spring element 34 is also shown in a rotated position in FIG. 3. The annular part of the unscrew protection device 44 is rotatable in the stepped bore of the lower terminating disk 20, so that the arm 48 may follow the rotary movement of the groove 52 of the sleeve 30. Thus, the arm 48 remains always in an angular position that corresponds to the open end of the horseshoe-shaped spring element 34, as can clearly be seen in FIG. 4.

Figure 4:
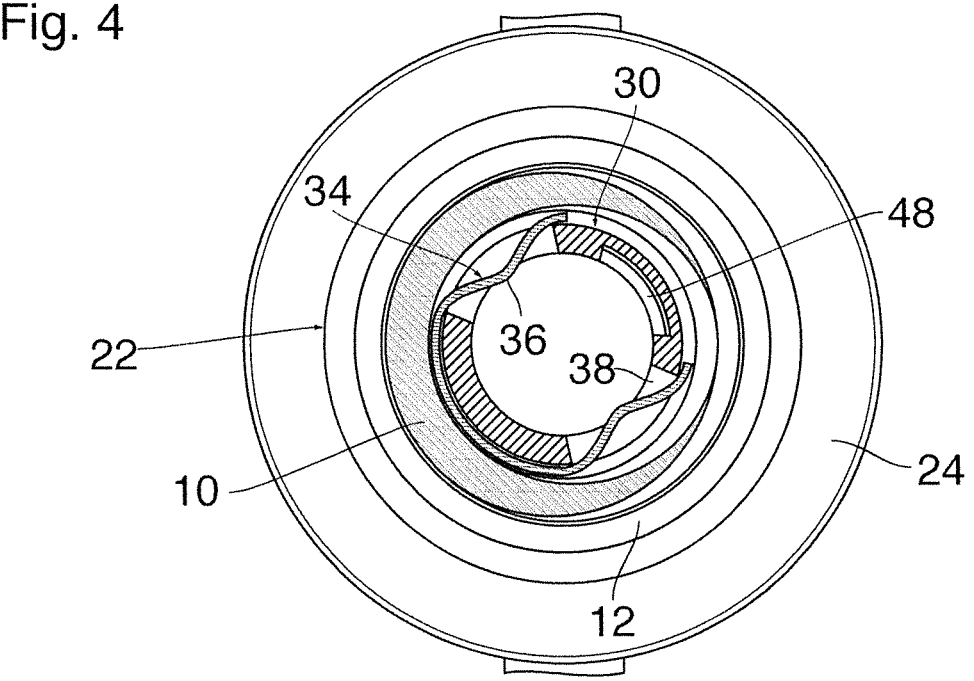
FIG. 4 is a sectional view along the line IV-IV in FIG. 3.

It can also be seen in FIG. 4 that the arm 48 and the complementary groove of the sleeve 30 form a (curved) dovetail profile, so that the arm 48 may move in the groove 52 exclusively in axial direction.

The assembly of the tolerance compensation element may for example be performed as follows.

The casing 22 is screwed with its internal thread onto the external thread of the outer threaded part 12. Subsequently, the terminating disk 20 is pressed into the bottom end of the casing 22. In this process, the snap claws 26 are temporarily deflected outwards, and they snap-in at the collar at the outer periphery of the terminating disk 20, whereby the casing 22 and the outer threaded part 12 are connected non-detachably to the terminating disk 20.

Starting from the position shown in FIG. 2, the spring element 34 is thrust onto the periphery of the sleeve 30 in radial direction until the prongs 36 snap-in in the windows 38. Then, the sleeve 30 is screwed into the inner threaded part 10 from below together with the spring element 34. Subsequently, the terminating disk 18 is pressed onto the top end of the threaded part 10 and the sleeve 30. In that process, the snap claws 40 snap-in at the stepped bore 42, so that the terminating disk 18 is held non-detachably at the sleeve 30 and the inner threaded part 10.

Then, the unit formed by the threaded part 10, the sleeve 30 and the spring element 34 is screwed into the internal thread of the outer threaded part 12 from above.

Finally, the arm 48 of the unscrew protection device 44 is inserted from below into the channel 32 of the sleeve 30 and, as soon as the claw 50 is in a position above the stop 54, is moved radially outwards, so that the claw can reach over the stop 54. The taper of the dovetail profile may be so small that the arm 48 can be snap-fastened in the groove 52 in a movement directed radially outwards. Optionally, the dovetail profile of the groove 52 may be somewhat widened at its lower end, adjacent to the stop 54, so that the end that carries the claw 50 can be inserted into the groove and the arm 48 can then be inserted axially into the dovetail profile.

When the position shown in FIG. 1 has been reached, a nose 56 that is formed at the outer periphery of the angular part of the unscrew protection device, snaps-in at the top side of the terminating disk 20 while the collar 46 engages in the stepped bore of this terminating disk. The unscrew protection device 44 is then locked against rotation in the tolerance compensating element that is then in a condition ready for use.

What is claimed is:

1. A tolerance compensating element for a device for connecting components by a connecting screw, said tolerance compensating element comprising:
   an inner and an outer threaded part, which are in threaded engagement with one another and, together, form a length-adjustable spacer,
   a spring element,
   a sleeve which is held in the inner threaded part and holds the spring element in a position in which it comes into frictional contact with a circumference of the inserted connecting screw, the sleeve including a stop, and
   an unscrew protection device in the form of a ring that is rotatably supported at one end of the spacer and comprises at least one arm which projects axially into the sleeve and, at a free end thereof, forms an outwardly cranked claw against which the stop formed on the sleeve abuts when a maximum unscrewing distance of the inner threaded part is reached.

2. The tolerance compensating element according to claim 1, wherein the at least one arm of the unscrew protection device is received in an undercut groove in an inner peripheral surface of the sleeve and has a profile complementary to the profile of that groove.

3. The tolerance compensating element according to claim 1, wherein the sleeve has, at least on a part of an outer periphery thereof, a thread that permits to screw the sleeve into the inner threaded part.

4. The tolerance compensating element according to claim 1, wherein at least one of the threaded parts is formed of a wire that has been wound into a coil.

5. The tolerance compensating element according to claim 4, wherein the wire has a square cross-section and is wound such that a diagonal of the square cross-section extends in an axial direction of the coil and individual turns thereof are engaging one another in a block configuration.

6. The tolerance compensating element according to claim 4, wherein both threaded parts are formed of wound wire.

7. The tolerance compensating element according to claim 4, further comprising a metal terminating disk mounted on at least one end of the spacer, said disk having, on a side facing the wire, a depressed relief that is complementary to a last turn of the wire of at least one of the threaded parts.

8. The tolerance compensating element according to claim 7, wherein the sleeve is snap-fastened to the terminating disk that engages the inner threaded part.

9. The tolerance compensating element according to claim 7, wherein the ring of the unscrew protection device has, at an outer periphery thereof, a collar and is rotatably received in a stepped bore of the terminating disk of the outer threaded part.

10. The tolerance compensating element to claim 1, further comprising a plastic casing surrounding the outer threaded part.

11. The tolerance compensating element according to claim 10, wherein the casing has an internal thread and is screwed onto an external thread of the outer threaded part.

12. The tolerance compensating element according to claim 10,
   further comprising a metal terminating disk mounted on at least one end of the spacer, said disk having, on a side facing the wire, a depressed relief that is complementary to a last turn of the wire of at least one of the threaded parts, and
   wherein the casing is snap-fastened to the terminating disk that engages the outer threaded part.

* * * * *